(12) United States Patent
Ogonowsky

(10) Patent No.: US 6,771,047 B1
(45) Date of Patent: Aug. 3, 2004

(54) AUTOMATIC BATTERY DISCHARGING AND CHARGING TECHNIQUE TO INCREASE BATTERY LIFE

(76) Inventor: Brian D. Ogonowsky, 307 N. Clark Ave., Los Altos, CA (US) 94022

( * ) Notice: Subject to any disclaimer, the term of this patent is extended or adjusted under 35 U.S.C. 154(b) by 0 days.

(21) Appl. No.: 10/349,821

(22) Filed: Jan. 22, 2003

(51) Int. Cl.$^7$ ................................................ H02J 7/00
(52) U.S. Cl. ........................................ 320/128; 320/127
(58) Field of Search ............................... 320/128, 127, 320/125, 126, 135, 152, 138, 130, 132, 133, 134

(56) References Cited

U.S. PATENT DOCUMENTS 4,562,398 A * 12/1985 Kotlarewsky
6,463,545 B1   10/2002 Fisher et al. ................ 713/340
2003/0057919 A1 *  3/2003 Yang ............................ 320/152

* cited by examiner

Primary Examiner—Lawrence Luk

(57) ABSTRACT

A technique for prolonging the life of a rechargeable battery in a computer is disclosed, wherein an automatic discharging and charging cycle occurs only during a time when the user does not anticipate ever needing to operate the computer using the battery. In another technique for prolonging the life of a rechargeable battery, to eliminate frequent topping off of the battery's charge by the computer's recharging routine, the battery is only automatically topped off after a relatively long interval if the computer remains plugged in. Such topping off may occur after the battery charge has fallen to a certain charge level or only after an extended time period. The time period may be set by the user. By topping off less frequently, the battery life is extended.

23 Claims, 4 Drawing Sheets

AUTOMATIC BATTERY DISCHARGING AND CHARGING TECHNIQUE TO INCREASE BATTERY LIFE

FIELD OF THE INVENTION

This invention relates to devices incorporating a rechargeable battery, such as computers and wireless phones.

BACKGROUND

U.S. Pat. No. 6,463,545, incorporated by reference in its entirety, describes a battery calibration technique. The '545 patent describes discharging a rechargeable battery in a laptop computer to substantially zero charge in order for the computer's charge detection circuits to accurately determine the amount of computer operating time left before the battery power runs out. While the computer is plugged into an AC outlet, a calibration circuit automatically initiates a calibration mode, whereby the main power source is decoupled from the computer, and the battery supports the computer operation until the battery discharges to a level slightly above a zero charge. This is considered a zero state, which is then used to calibrate the power management software so that the software can better determine how much battery time is left before the computer is forced to be shut down. The main power supply is then automatically reconnected to the computer, and the battery is charged normally until the battery is fully charged. After some period, not identified in the '545 patent, the calibration technique is again commenced.

A scenario given in the '545 patent is that the calibration technique occurs during normal computer operation when the computer is turned on and in use. However, it may be disastrous for the laptop computer operator to decide to unplug the computer from the wall during the middle of the calibration sequence and continue her work on the laptop at another location. Since the calibration sequence occurs without user intervention, the user may unplug the AC connection only to find that the battery is virtually dead due to the interruption of the calibration sequence.

SUMMARY

One embodiment of the present invention augments the invention in the '545 patent by only performing the automatic discharging and charging cycle during a time window authorized by the user. Such an authorized time window will most likely be a time in the middle of the night when the user does not anticipate ever using the computer unplugged from the AC outlet. Hence, if the computer is plugged into an AC outlet, the controller for the automatic discharging and charging technique reads the time of day clock in the computer, compares this clock to the authorized time window for performing the technique, and initiates the technique if the time of day falls within the authorized time window.

It is well known that a battery's life is prolonged if it is periodically fully discharged and recharged. This relates to the memory effect of the battery. Thus, the automatic discharging and charging of the battery not only calibrates the power management system but prolongs the life of the battery while not interfering with the use of the computer.

In another embodiment, the automatic discharging and charging technique is not related to calibration, but is performed periodically to prolong the life of the battery.

In another embodiment, the authorized time window for performing the discharging and charging technique is a default time that is intended to occur at a time when the computer is typically not in use.

In another embodiment, additional techniques are used to increase the life of the battery. As mentioned above, it is known that batteries should be discharged to a low level periodically in order that they can retain a greater charge, in contrast to a battery that is constantly being topped off without first being significantly discharged. For example, when a laptop computer is plugged into the wall for long periods of time, the battery is continually or periodically being topped off. Such a battery will have a shorter useful lifetime then a battery that had been occasionally discharged by the user unplugging the computer from the wall and plugging the computer back into the wall when the "low battery" alarm was signaled in the computer. To eliminate such frequent topping off, a method is carried out whereby the battery is only automatically topped off after a relatively long interval if the computer remains plugged in. Such topping off may occur after the battery charge has fallen to a certain charge level or only after an extended time period. The time period may be set by the user. Accordingly, by topping off less frequently, the battery life is extended.

The present invention is not limited to computers, but is generally applicable to all devices incorporating a rechargeable battery.

DETAILED DESCRIPTION

Figure 1:
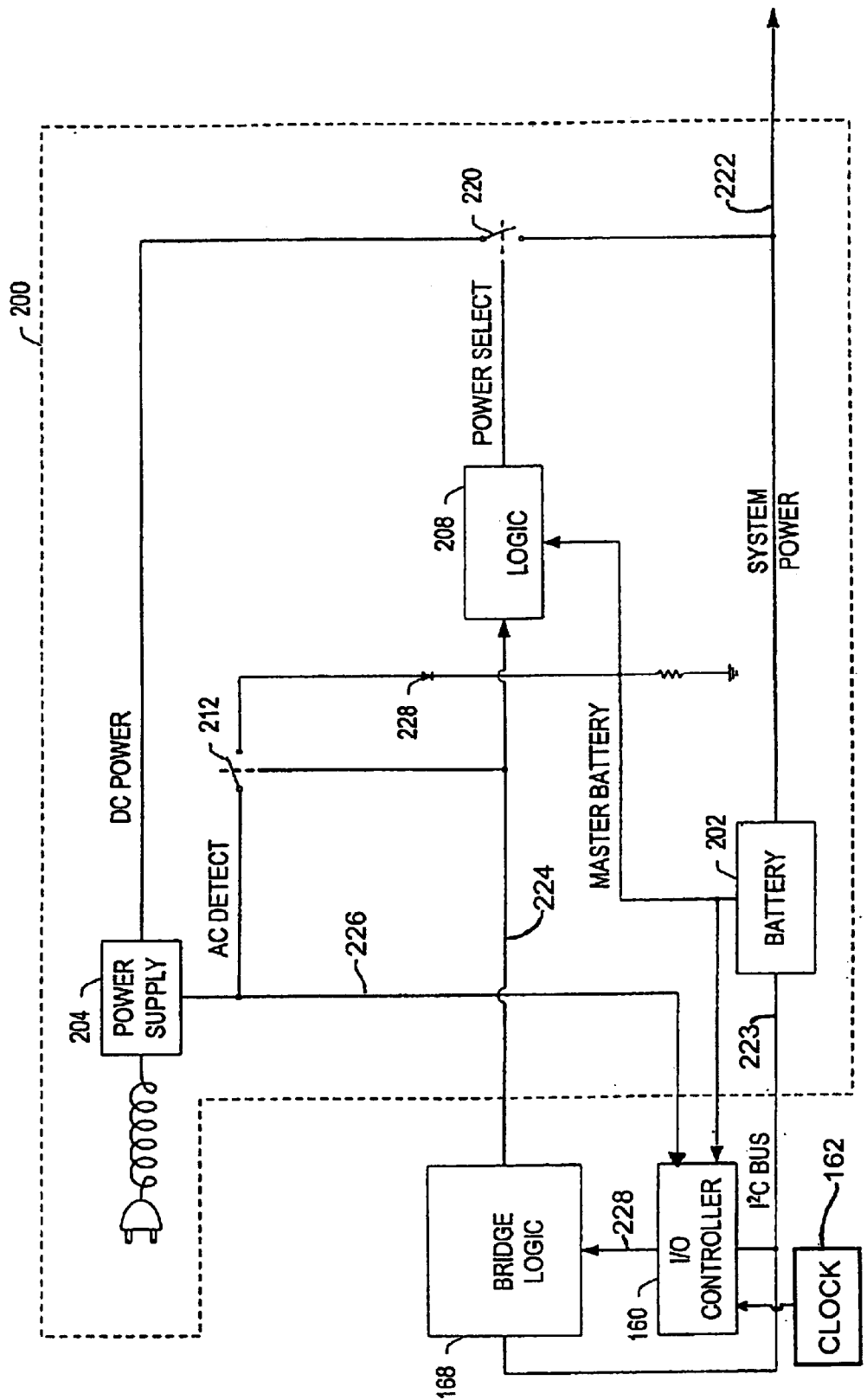
FIG. 1 is a schematic diagram of the power management portion of a device, such as a computer.
Figure 2:
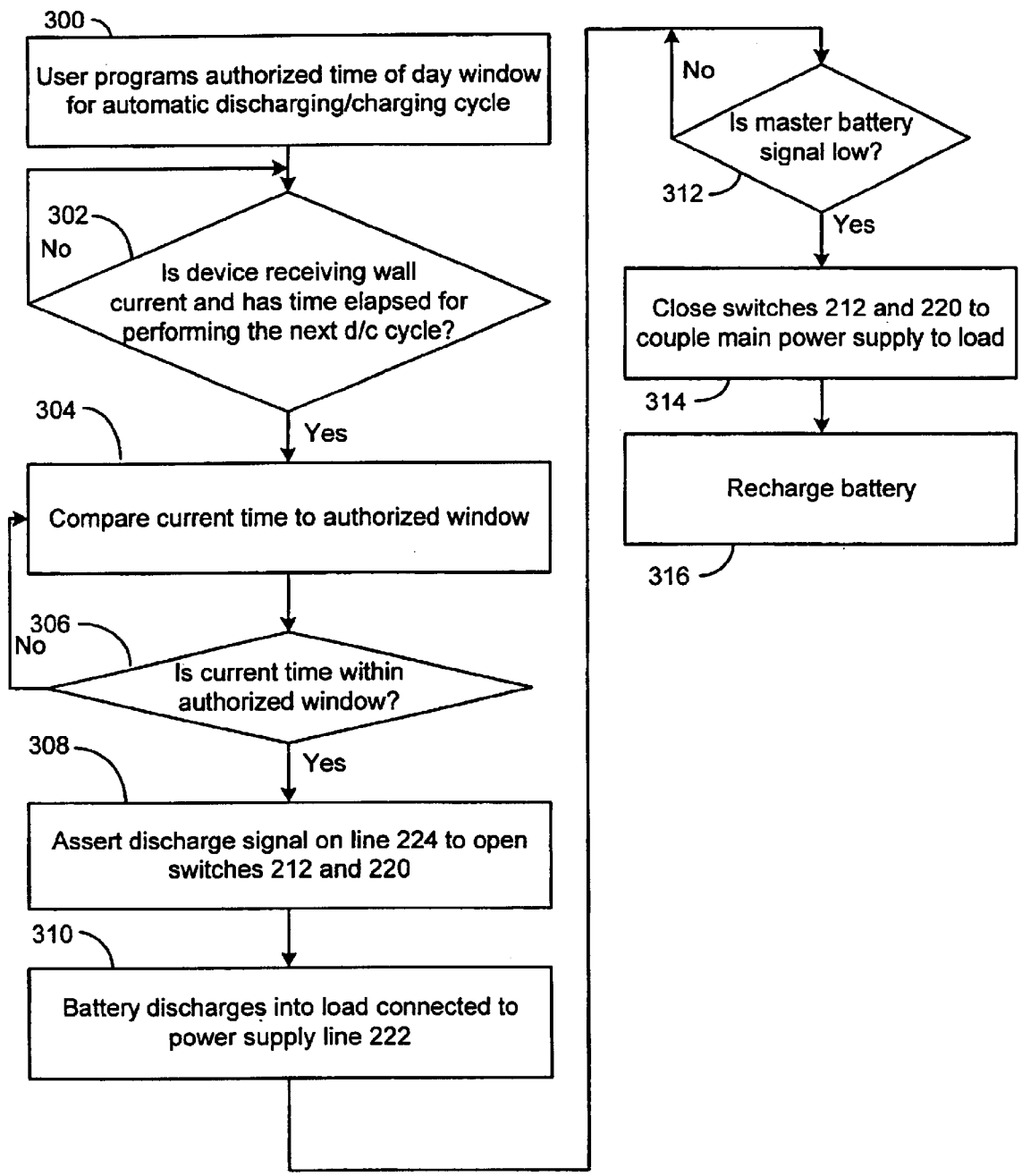
FIG. 2 is a flowchart of a method performed by the circuit of FIG. 1.

FIG. 1 is similar to FIG. 2 of U.S. Pat. No. 6,463,545, previously described, except that I/O controller 160 also senses a time of day from clock 162 (or an internal clock) and only initiates a discharge/charge cycle at times authorized by the user. The remainder of the elements in FIG. 1 are described in detail in the '545 patent, so a detailed explanation of those prior art elements is not necessary.

FIG. 1 illustrates a power subsystem 200 for a device such as a computer or telephone. Subsystem 200 includes a conventional power supply 204. Power supply 204 generally comprises a rectifier and smoothing circuit for converting a wall outlet AC voltage into an unregulated DC voltage. This unregulated DC voltage is applied to a voltage regulator that outputs a fixed DC voltage, such as 18 volts. The voltage regulator will typically be a switching voltage regulator that uses either current mode or voltage mode techniques.

A switch 220 is normally closed for coupling a system power bus 222 to the power supply 204. A computer or other load is connected to the power bus 222. Power subsystem 200 is typically located within the computer body.

The I/O controller 160 interfaces various input devices, including a power switch and a suspend switch, and handles power management functions such as reducing power to various components such as the display, floppy drive, hard disk drive, and various other circuits to place the computer into a low power sleep mode. Controller 160 is connected to a bus 223 that communicates with a microprocessor and registers in battery 202 to select the operating mode of battery 202 (e.g., charge, discharge, idle) and read the status of the various registers, including a charge register.

Bridge logic 168 couples various buses together and shares power management functions with I/O controller 160, as described in the '545 patent. The functions required to carry out the present invention are relatively simple, and the circuitry of FIG. 1 may be simplified yet still carry out the invention.

The operation of the circuit of FIG. 1 will be described with respect to the flowchart of FIG. 2.

In step 300 of FIG. 2, upon setting up of the computer, the user is prompted to enter a period of time, such as a four hour window, in which the user authorizes the computer's power subsystem 200 to enter into an automatic discharging and charging routine to extend the life of the battery and optionally calibrate the battery life detector. The user will most likely select a window in the middle of the night when the user is not likely to unplug the computer from wall current and use the computer. The user may enter the time window via the computer's keyboard or by clicking on an icon with a mouse. This window is then stored in a memory that is accessible by the I/O controller 160. The memory may be internal to I/O controller 160.

The computer manufacturer determines the optimum period between the automatic discharging/charging cycles, such as once per week, and this information is also stored in a memory. This value may instead be set by the user and may depend on the recommendations of the battery manufacturer. In another embodiment, the optimum period is stored in the battery's memory by the manufacturer.

In steps 302, 304, and 306, I/O controller 160 detects the current date and time from clock 162. Clock 162 may provide its time and date signal via a bus, or the clock may be internal to I/O controller 160. I/O controller 160 determines whether all three of the following conditions are occurring: 1) the period set by the manufacturer for the automatic discharging/charging cycle has elapsed; 2) the computer is receiving AC current (detected on line 226); and 3) the time of day is within the authorized window set by the user. If all these conditions occur, I/O controller 160 (or any other device involved with initiating the routine) transmits a signal to logic 168 to initiate the discharge/charging cycle. If the time of day is not within the authorized window, the discharge/charge cycle is delayed (step 306) until the time window occurs.

Assuming all three conditions are met, I/O controller 160 issues a discharge/charge signal to bridge logic 168 via line 228. In response, bridge logic 168 pulls line 224 high. This high signal opens switch 212 and controls logic 208 to open up switch 220 (step 308). Opening up switch 220 causes the battery 202 charge to drain into the load (e.g., the computer components) coupled to the power bus 222. Opening switch 212 causes the master battery signal to be solely dependent on the charge status of battery 202, as described in the '545 patent. Battery 202 generates a high master battery signal when there is adequate charge to power the load.

Instep 310, battery 202 discharges into the load via power bus 222. Since I/O controller 160 senses from line 226 that the computer is receiving AC current, I/O controller 160 does not place the computer into a standby, sleep, or hibernate mode when the battery charge goes below a typical low charge threshold (e.g., 3%). Hence, battery 202 can discharge to near zero charge.

When the battery has about 4 seconds of charge left, battery 202 pulls the master battery level low (step 312). In step 314, this low signal controls logic 208 to close switch 220 to again couple the DC voltage from the power supply 204 to the computer so that the computer has no break in power. The change in master battery level also signals I/O controller 160 to issue a signal to bridge circuit 168 to deassert the discharge/charge cycle signal on line 224. This closes switch 212. I/O controller 160 then controls battery 202 via bus 223 to be in the charging mode to fully charge battery (step 316). The computer is now in a normal operating mode.

When the computer is not turned on and operating, very little current is drawn by the computer. The computer will typically be off or in a standby mode during the user-set authorized window. Hence, the discharging of the battery may take days, which is unacceptable. In one embodiment, when the discharge cycle is initiated, I/O controller 160 automatically turns on the computer. This is a simple task since I/O controller 160 is coupled to the main power switch of the computer. Turning on the computer causes the computer to be a high current load, thus rapidly draining battery 202 within approximately 2–3 hours. The signal that turns on the computer during the discharging mode also signals the power management software to ignore the conventional standby and hibernate times typically set by the user. For example, the user may set the standby time, where no action is taken on the computer, to 15 minutes. Normally, if no action is taken on the computer in 15 minutes, the screen, hard drive, and microprocessor are put into a low current mode. This would be overridden by I/O controller 160 during the discharging cycle so that the computer would not go into a standby mode until the entire discharging cycle has been completed. If the user had turned off the computer before the discharge cycle, I/O controller 160 would turn the computer off after the discharge cycle was complete.

Figure 3:
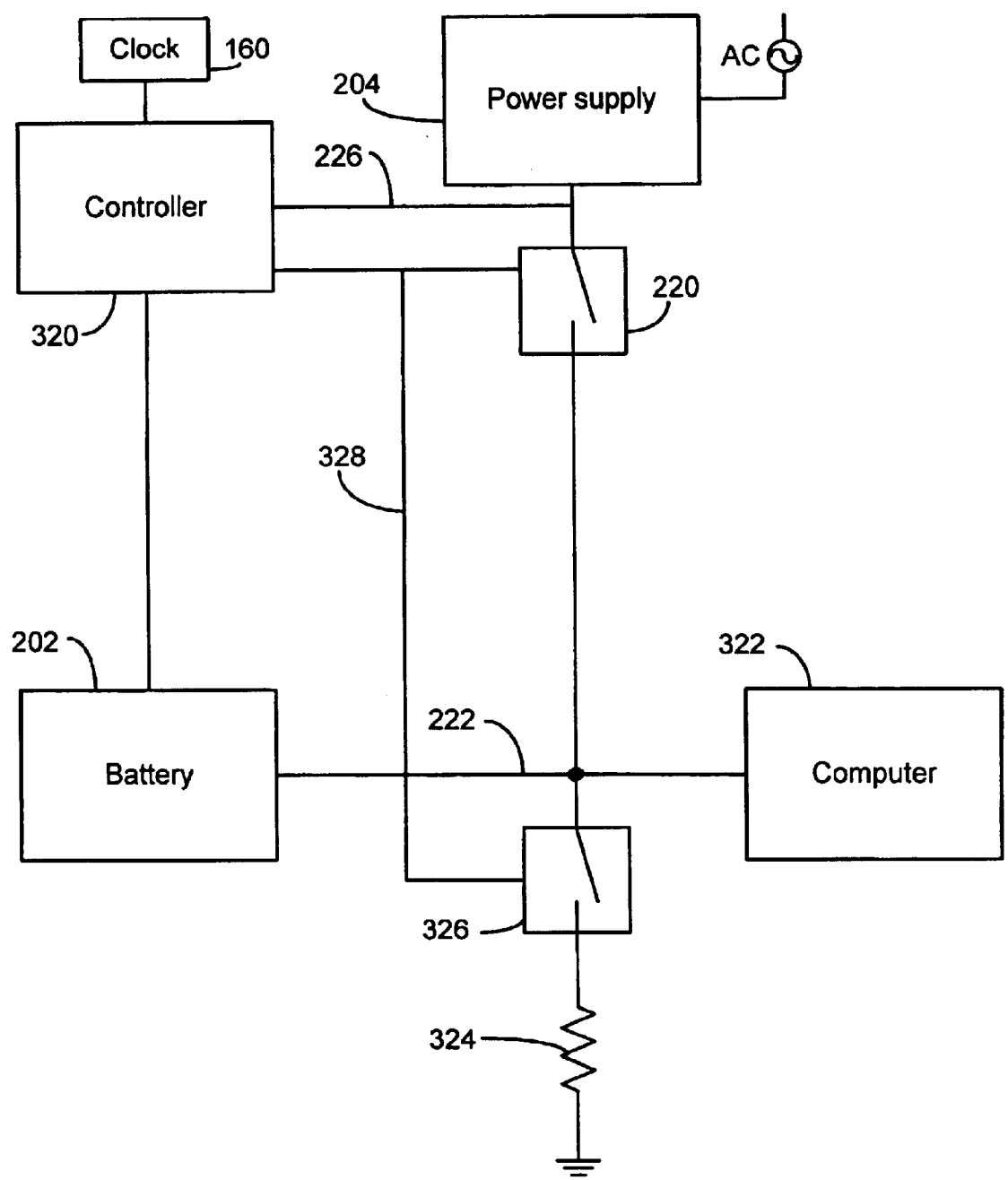
FIG. 3 is a simplified diagram of a computer system, or other apparatus, where a resistive load may be coupled to the battery to discharge the battery.

FIG. 3 is a simplified version of the automatic discharging/charging circuit, where controller 320 interfaces with battery 202 and switch 220 to control the automatic discharging/charging cycle. Controller 320 opens switch 220 at the initiation of the automatic discharging/charging process when the three conditions are met, as discussed above. It may not be advantageous to turn on the computer 322 during the automatic discharging/charging process due to noise, heat, wear and tear, etc. Instead, to quickly drain battery 202, a resistive load 324 (or other type of load) is coupled to power bus 222 via a switch 326 to drain the battery charge in a few hours. Both switches 220 and 326 may be controlled by the same signal on line 328. The termination of discharging and the initiation of charging may be performed in the manner previously described.

An additional feature of the invention may be the recognition by I/O controller 160 (or controller 320 in FIG. 3) that the battery 202 has been recently discharged to a low level and recharged during normal operation of the computer and, thus, the automatic discharging/charging process may be skipped. In such an embodiment, the date/time of the last full discharge is recorded in the I/O controller 160 memory. If the time for the periodic automatic discharge/charge process arises and the battery was recently discharged during its normal operation, I/O controller 160 will skip the automatic discharge/charge operation.

In another embodiment of the invention, it is recognized that battery life is diminished due to the battery being frequently "topped off" pursuant to typical charging routines for batteries in a laptop computer or other device. Less frequent topping off of the battery when the computer is left plugged in would prolong the battery life. However, the user wants the battery to be fully charged whenever the user disconnects AC power from the computer. Hence, there is a tradeoff between maximizing the battery life and providing a maximum charge for the battery. This dilemma is solved by the method of FIG. 4.

Figure 4:
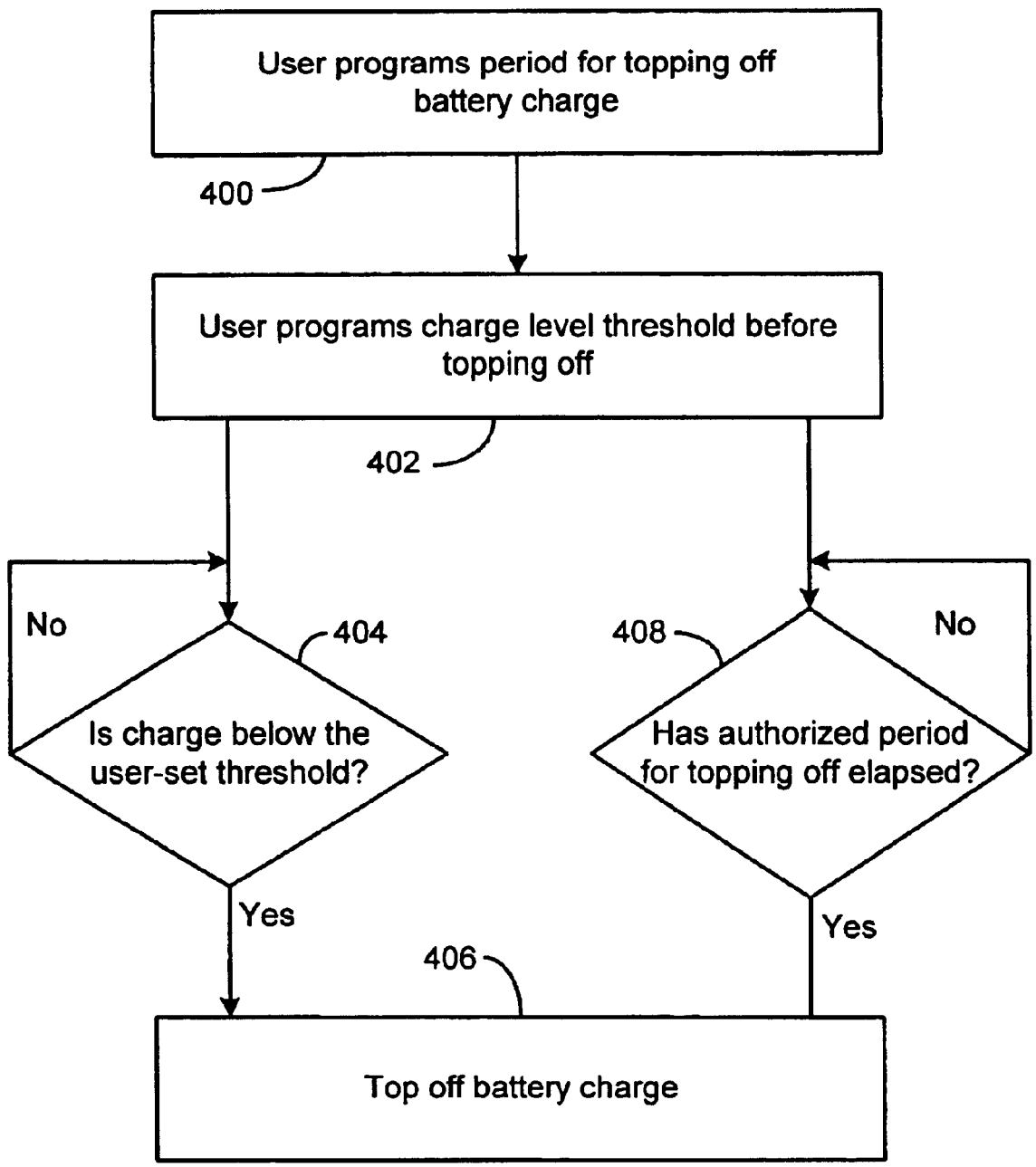
FIG. 4 is a flowchart of a method to limit the frequency of topping off the battery.

In step 400 of FIG. 4, during the set up of the computer, the user is prompted by the computer to identify an allowable period between topping off the battery when the computer is plugged into the wall socket. The manufacturer may provide the user with a graph illustrating battery life versus the frequency of topping off. The user then sets the period (e.g., one day) that the power system must wait before again topping off the battery.

In step 402, the user sets the charge level threshold (e.g., 90%), whereby the battery will be immediately topped off if the charge (identified by the battery's charge register) falls below the threshold. The user may input her settings via the computer's keyboard or a mouse.

In step 404, I/O controller 160 determines if the charge in battery 202 is below the threshold. If so, battery 202 is immediately topped off to fully charge battery 202 (step 406).

In step 408, I/O controller 160 determines if the authorized period for topping off has elapsed. If so, then the normal routine for topping off the battery is performed (step 406). Such a normal routine may top off the battery even if the charge is 98%.

In an alternate embodiment, only the user-set charge threshold is used to reduce the frequency of topping off, and steps 400 and 408 are eliminated.

Accordingly, the process of FIG. 4 reduces the number of topping off charging cycles, thus prolonging the life of the battery.

The controllers for the inventive techniques described may be simple logic circuits, easily designed by those skilled in the art.

The techniques described herein can be applied to any device that uses a rechargeable battery, including wireless phones, such as cell phones and home wireless telephones.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A method for automatically discharging and charging a battery connected to an electrical device, the battery and a power supply for being coupled to a power supply line for powering a first load, the power supply being for receiving wall current and supplying power to the first load via the power supply line, wherein the method is, at least in part, controlled by a controller, the method comprising:
    establishing within a memory of the device an authorized time of day window to perform an automatic battery discharging and charging operation, the time window being selected by a user of the device;
    sensing, by a controller, a current time within the authorized time window;
    automatically disconnecting the power supply from the power supply line, only if the current time is within the authorized time window;
    supplying current from the battery to discharge the battery until the battery charge falls below a predetermined level; and
    after the battery charge falls below the predetermined level, reconnecting the power supply to the power supply line.

2. The method of claim 1 wherein the predetermined level is prior to a zero charge state of the battery.

3. The method of claim 1 further comprising indicating to the controller that the power supply is receiving wall current, even after disconnecting the power supply from the power supply line, such that the controller does not place the device in a low power mode upon the battery reaching a low charge state.

4. The method of claim 1 further comprising recharging the battery after the power supply is reconnected to the power supply line.

5. The method of claim 1 where the first load is a computer.

6. The method of claim 1 wherein the first load is a wireless telephone.

7. The method of claim 1 further comprising coupling a second load to the power supply line after the power supply is disconnected from the power supply line so that the battery is discharged into the second load during the act of supplying current from the battery.

8. The method of claim 7 wherein the second load is resistive.

9. The method of claim 1 wherein connecting and disconnecting the power supply from the power supply line comprises actuating a switch between the power supply and the power supply line.

10. The method of claim 1 wherein supplying current from the battery to discharge the battery comprises monitoring a status signal from the battery to determine when the battery charge falls below the predetermined level.

11. The method of claim 1 further comprising establishing a time period between consecutive automatic battery discharging and charging operation and storing the time period in a memory.

12. The method of claim 1 wherein the time window is during the night.

13. The method of claim 1 wherein supplying current from the battery to discharge the battery comprises supplying current from the battery through the power supply line.

14. The method of claim 13 wherein supplying current from the battery comprises supplying current to the fist load.

15. The method of claim 1 wherein the time window is a default time window approved by the user.

16. The method of claim 1 further comprising determining if a sufficient discharge of the battery has occurred within a specified time and delaying the automatic bay discharging and charging operation until after a certain period has elapsed.

17. The method of claim 1 further comprising automatically turning on the device during or prior to supplying current from the battery to reduce a discharge time of the battery.

18. A system comprising:
    a power supply for converting AC wall current to a DC voltage to power a first load;
    a rechargeable battery for powering the first load;
    a user input device for establishing within a memory of the system an authorized time of day window to perform an automatic battery discharging and charging operation;
    a controller; and
    a switch, controlled by the controller to selectively couple the power supply to the power supply line;
    the controller for initiating the automatic battery discharging and charging operation by sensing a current time occurring within the authorized time window and opening the switch to disconnect the power supply from the power supply line, only if the current time is within the authorized time window, the power supply line being coupled to the battery for carrying current from the battery to discharge the battery until the battery charge falls below a predetermined level, the controller from detecting that the battery charge falls below the predetermined level and, in response, closing the switch to reconnect the power supply to the power supply line.

19. The system of claim 18 wherein the battery recharges, after the power supply is reconnected to the power supply line.

20. The system of claim 18 wherein the first load is a computer.

21. The system of claim 18 wherein the first load is a wireless telephone.

22. The system of claim 18 further comprising a second load connected to the power supply line after the power supply is disconnected from the power supply line so that the battery is discharged into the second load.

23. The system of claim 22 wherein the second load is resistive.

* * * * *